United States Patent Office 3,687,751
Patented Aug. 29, 1972

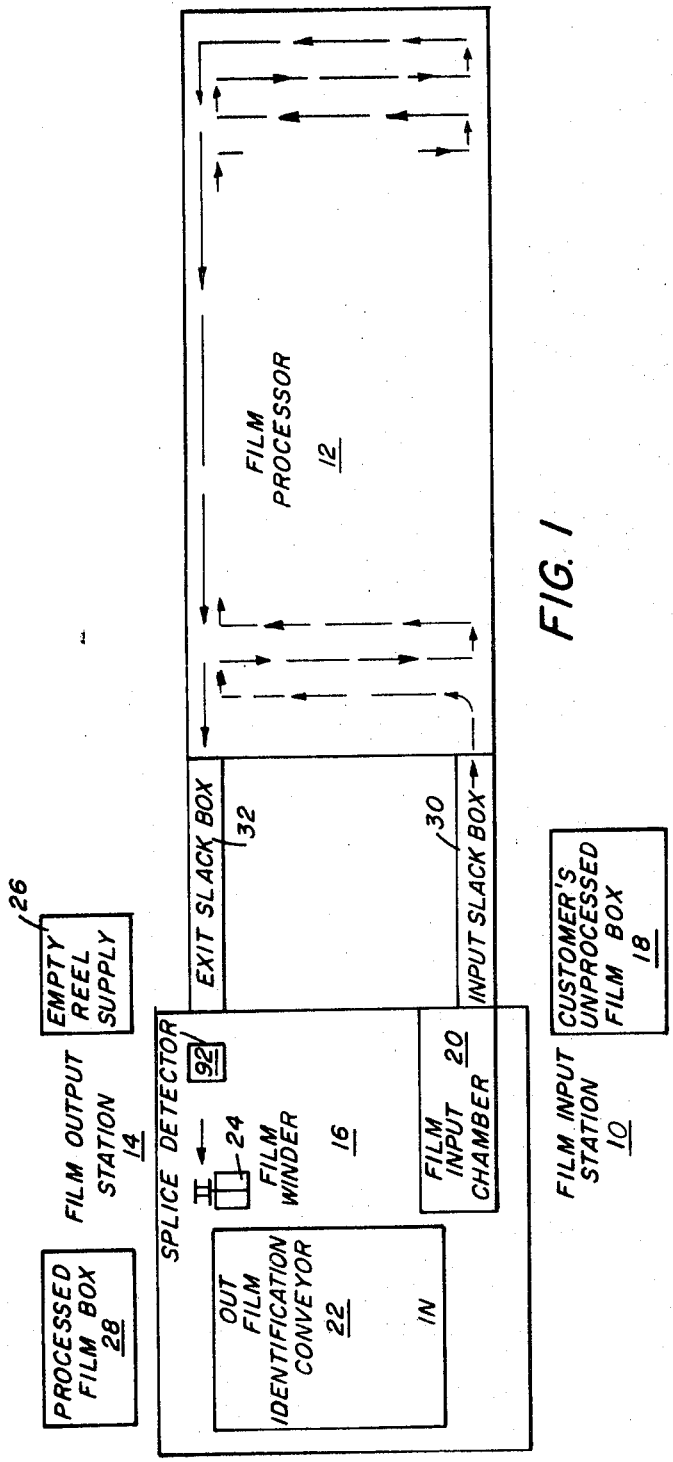
Aug. 29, 1972    P. E. CUMBO ET AL    3,687,751
FILM PROCESSING METHOD
Original Filed April 30, 1969    3 Sheets-Sheet 1
PETER E. CUMBO
JAMES L. HART
PETER T. KAO
GEORGE T. NEGUS
INVENTORS
BY
ATTORNEY

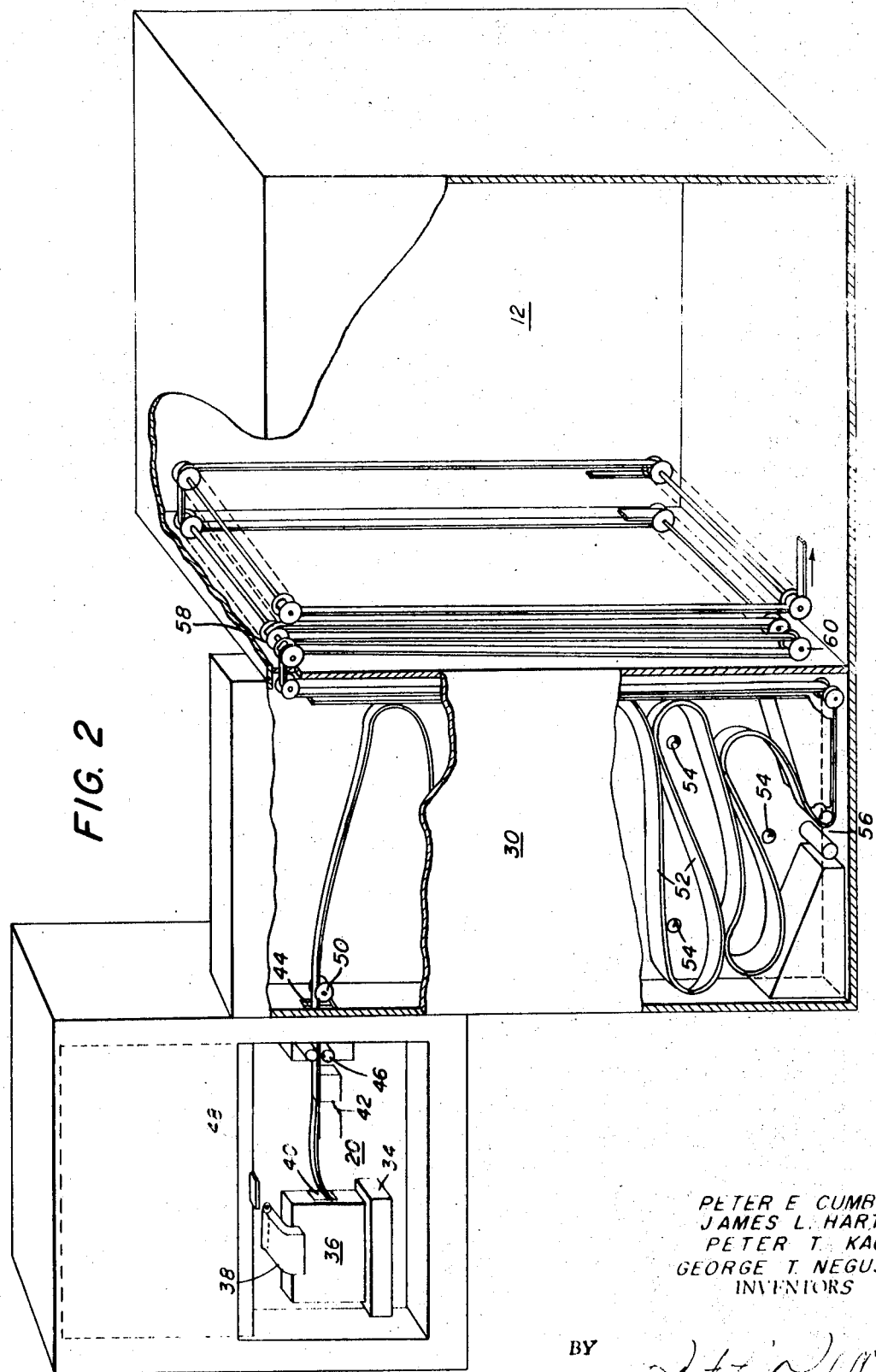

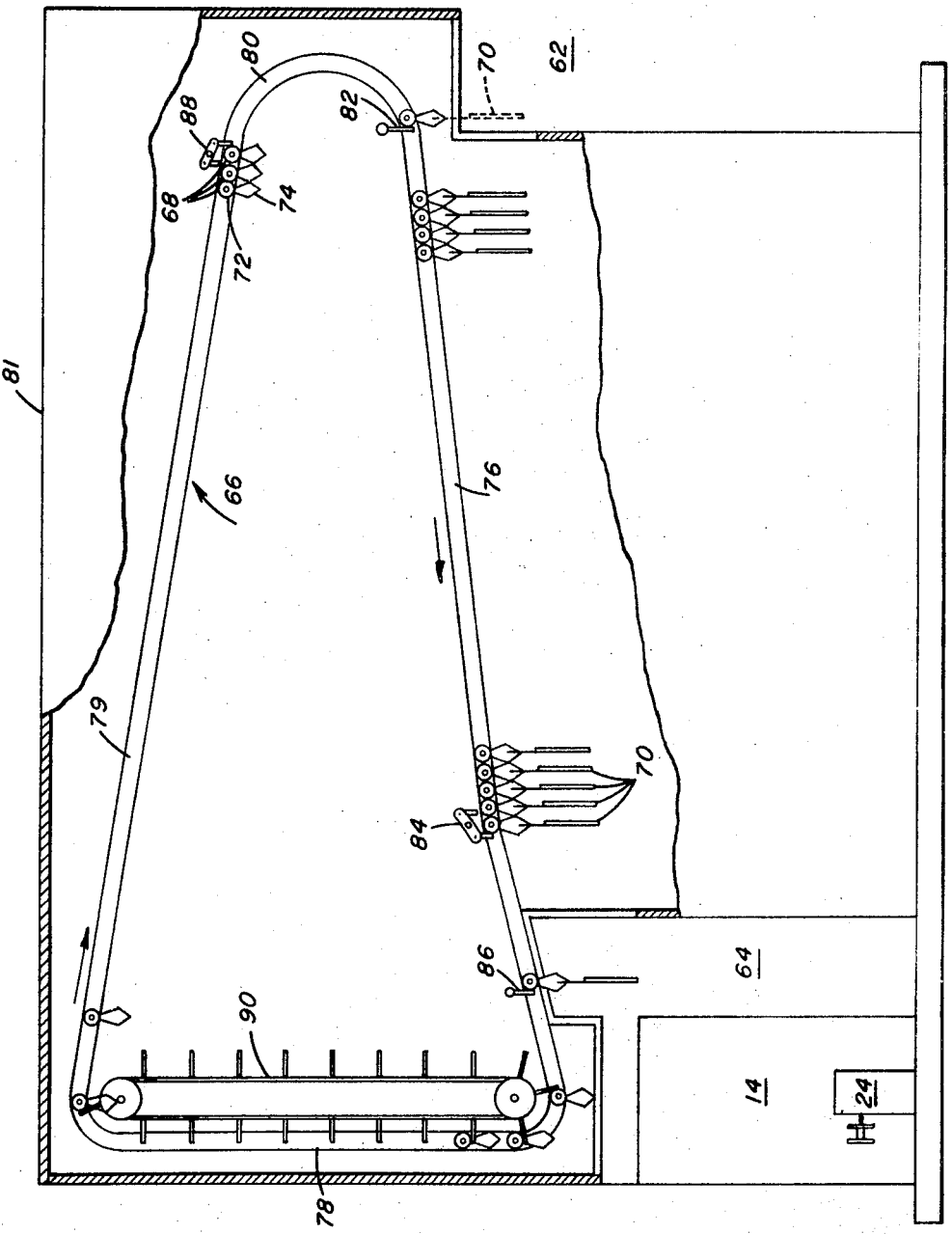

3,687,751
FILM PROCESSING METHOD
Peter E. Cumbo and James L. Hart, Rochester, Peter T. Kao, West Webster, and George T. Negus, Penfield, N.Y., assignors to Eastman Kodak Company, Rochester, N.Y.
Original application Apr. 30, 1969, Ser. No. 820,379. Divided and this application Feb. 4, 1971, Ser. No. 112,533
Int. Cl. B31f 5/00; G03d 15/04
U.S. Cl. 156—64
9 Claims

ABSTRACT OF THE DISCLOSURE

A method for continuously processing sequentially a plurality of film strips wherein the individual lengths or strips of film are spliced into a substantially continuous strip which is passed through a film processor. The individual lengths of film can be identified by an identification means having an input at the input end of the processor and an output at the output end of the processor. Film identifier carriers are presented sequentially by the identification means to the input end of the processing apparatus, and the film identifier carrier advances from the input end only after a fil midentifier for a film strip is inserted therein and the corresponding strip of film is fed to the film processor. The carriers are moved by conveyor driving means in synchronization with the film processor so that the film identifier carrier and the corresponding processed and finished film are delivered to the output end of the processor substantially simultaneously. The output of film from the processor occurs only when the corresponding film identifier is at the output end of the processor.

The present application is a division of U.S. patent application Ser. No. 820,379, filed Apr. 30, 1969, now abandoned said application having been refiled on Mar. 22, 1971, as a continuation application Ser. No. 126,979.

BACKGROUND OF THE INVENTION

Commercial film processing generally utilizes a film processor through which the exposed film is passed in sequence through a series of operation-performing stations, including developing, fixing, washing and drying stations. In order for typical commercial film processors to operate continuously, individual strips of exposed film as received from the customer are spliced end-to-end to form a continuous length which is wound onto a reel and subsequently passed in a substantially continuous manner through the processor. Inasmuch as the exposed film is susceptible to fogging by light, it is necessary for the film to be handled in substantial darkness. Generally, the film arrives at the film processing plant in a light-tight container located in an identifying envelope, the envelope bearing the name and address of the film owner, or other owner identification. The film, still in its light-tight container and in the customer identification envelope, is usually placed with other film of similar characteristics and is transported to a darkroom. In the darkroom, the film is removed from the customer identifying envelope and the light-tight film container is opened. One end of the strip of film is then spliced to the trailing end of the preceding strip of film and is unwound from the container onto a master roll.

Inasmuch as the film must pass through operations in which it is immersed in chemicals and liquids which would destroy the customer identification on the envelope accompanying the film on its arrival at the plant, another form of identification must be applied to the film while it passes through the processor. Normally, at the time the film is spliced to the preceding strip of film, a common identification symbol is applied to both the film and the customer identification envelope. Examples of such identification markings include a perforated number in the film leader and a corresponding perforated number in the customer identification envelope or number-bearing tapes utilized for the splice between the adjacent strips of film and a correspondingly numbered tape applied to the envelope.

After a sufficient length of film has been spliced together to form a master roll, the roll is transferred to the input end of the processor. Thus, the processor is continuously supplied with film from master rolls. After the film has passed through the processor it is again wound onto a master roll which is then removed from the processor area for subsequent cutting, spooling and return to the customer. At the time the processed film is packaged for return to the customer it is necessary to rematch the identification number on the film with the same identification number on the customer identification envelope.

It will be appreciated that each of the foregoing operations, which require handling of the film and/or the customer identification envelope, introduces a possibility of damage to the film and/or error in, or loss of, the identification thereof. Also, each of the foregoing handling steps is both time consuming and expensive, requiring subtial amounts of time of an employee. Moreover, each of the foregoing steps creates a delay in the flow of the film from receipt to packaging the finished film, increasing the time required for returning the film to the owner.

It is apparent that an arrangement which permits the processing of individual articles, such as film strips, without the necessity of providing secondary identification thereto, while still assuring the proper identification of the individual articles after processing, is extremely desirable. Such an arrangement would permit increased processing rates and reduced costs by substantially reducing the handling steps necessary to properly identify the articles after processing.

SUMMARY OF THE INVENTION

An object of the present invention is to provide a film processing method which effects increased ease and economy of film handling.

Another object of the invention is to eliminate the usual need for placing certain identification on a strip of film to be processed without loss of the correlation between the film strip and separate identification means.

A still further object of the invention is to provide an improved film processing method which reduces the number of times that the film needs to be handled, thereby reducing the time and expense required for processing.

In accordance with the present invention a film processing method is provided for continuously processing a plurality of individual lengths of film, each of which is identified by a corresponding separable identification means. The method includes splicing individual lengths of film into a substantially continuous strip and then passing the strip through a film processor. Simultaneously, the corresponding identification means for the individual lengths of film is transferred from an input station adjacent an input end of the film processor to an output station located adjacent the output end of the processor. The path for the identification means is separate from the path of the film strip through the processor.

The various features of novelty which characterize the present invention are pointed out with particularity in the claims annexed to and forming a part of this specification. For better understanding of the invention, its operating advantages and the specific objects obtained by its use, reference should be had to the accompanying drawings and descriptive matter in which a preferred embodiment of the present invention is illustrated and described.

BRIEF DESCRIPTION OF THE DRAWINGS

FIG. 1 is a schematic illustration of a preferred embodiment of a processing and handling apparatus useful for practicing the method of the present invention;

FIG. 2 is a fragmentary perspective view, partially broken away, of the film loading station, input slack box and film processor of the apparatus illustrated in FIG. 1; and FIG. 3 is a view of an article identification conveyor located at the left end of FIG. 1.

DESCRIPTION OF A PREFERRED EMBODIMENT

A preferred embodiment of the method of the present invention will be described in connection with the apparatus illustrated in the drawing although it will be understood that other apparatus can be utilized to practice the invention. Referring now to the drawings, and to FIG. 1 in particular, the illustrated apparatus comprises a film input station 10, a film processor 12 and a film output station 14. The input and output stations are disposed on opposite sides of a counter or table 16 situated at one end of a photographic film processor 12, at the input end and the output end, respectively, thereof. The film loading or input station 10 provides an area for an input operator and gives easy access to a film box or container 18 in which the unprocessed film is delivered in bulk to the processor. The film is preferably delivered in the film box as received from the customer, in the identification envelope, having been sorted only as to film type to minimize handling time and expense. A film input chamebr 20 is conveniently disposed adjacent the input operator's station. A film identification conveyor 22 is disposed on the table 16 and is arranged with an input end at the film input station 10 and an output end at the film output station 14. A film winder 14, an empty film reel suply 26, and a container 28 for processed film is disposed at the film output station 14 within easy reach of an output operator.

The film input chamber 20 is connected in a light-tight manner to an input slack box 30. The film is supplied from the input chamber 20 to the input slack box 30 in an intermittent manner to be continuously supplied from the input slack box to the film processor 12, the inlet of which is connected to the outlet of the input slack box. The film processor 12 comprises a plurality of processing stations through which the film is continuously passed in a manner well known in the art. For example, the processor includes a developing section, followed by fixing, bleaching, etc. stations whereby the film is completely processed. Preferably, the processor is provided with a film drier and lubricator at the outlet end thereof. The output end of the processor is connected to the input of an exit slack box 32, whereby the finished film is continuously fed to the exit slack box for intermittent removal and packaging at the film output station 14. While the processor may be of nearly any type presently utilized for processing film, it is ideally constructed to permit operation in daylight conditions so that all processing operations may be conducted internally of the processor without the need for additional light-proofing other than that provided by the processor itself. On the other hand, another form of film processor may be used, in which case it would be disposed within a separate, adjacent darkroom, in a manner well known in the art. Morevoer, the processor incorporated in the present invention ideally utilizes a relatively short film threading path and contains a relatively small number of individual strips of film at one time. At the same time, the processing time required is preferably short so that, even through containing relatively few rolls of film at a single time, the overall production of the processor is relatively high.

Referring now to FIG. 2, the film input chamber 20, the input slack box 30, and the input end of the film processor 12 are illustrated in greater detail. The apparatus illustrated is adapted to process super-8 film (for example) and comprises a fixture 34 adapted to accept a super-8 film cartridge 36 containing exposed film. The fiixture incorporates a movable clamp member 38 to secure the cartridge in the deired orientation, with the cartridge aperture 40 to the right in the illustration. The cartridge holding fixture 34 may be constructed as illustrated, or as taught in co-pending application Serial No. 813,526, filed Apr. 4, 1969, in the names of Sutliff and Tucker, now U.S. Pat. 3,550,877, issued Dec. 29, 1970. Once the film cartridge is positioned in the cartridge fixture 34 and the clamp 38 has been closed over it, the cartridge normally will be held until automatically released, as will be described hereinafter. A film splicing station 42 is provided in the input chamber and is disposed adjacent a light lock inlet 44 to the input slack box 30. A film end detector 46 is disposed in the input chamber between the splicing station and the light lock entrance to the input slack box. A vertically sliding door or cover 48, shown in its open position, can be closed to make the input chamber light-tight.

In operation, the operator selects a customer identification envelope containing a film cartridge from the film box or container 18 and removes the film cartridge from the envelope. The cartridge is placed in the cartridge holding fixture 34 in the film input chamber 20 and the clamp 38 is closed over it. The customer identification envelope is inserted in the identification conveyor means (FIG. 3) as will be described hereinafter. The trailer end of the film (not containing any exposed pictures) is withdrawn from the cartridge aperture 40 and is brought to the splicing station 42 where it is spliced to the end of the preceding strip of film remaining in the input chamber. The splice is visually inspected by the operator and, if satisfactory, the light-tight door 48 on the film input chamber is closed and automatically latched by suitable means (not shown). This light-tight door excludes any light from the interior of the film input chamber so that the exposed film in the cartridge may be safety withdrawn from the cartridge and fed to the input slack box 30 by means of feed drive roller 50 in the upper portion of the input slack box. As the input chamber door 48 is latched, feed drive roller 50 at the inlet of the input slack box is activated, drawing the film out of the cartridge through the light lock and into the input slack box, forming a plurality of loops 52 therein, in a manner well known in the art. The film end detector 46 in the input chamber 20 detects the end of the film as it is withdrawn from the cartridge and stops the input drive roller 50 so that the end of the film (the leader in the cartridge and containing no exposure) remains in the input chamber in proper position at the splicing station 42. The input chamber door 48 is then automatically reopened by suitable means (not shown) and the cartridge fixture latch 38 is released, permitting the removal of the empty cartridge so that a new film cartridge may be inserted.

The film forms a plurality of loops 52 in the input slack box 30 and is prevented from crushing the lowermost film loops by a plurality of ball members 54 which are spring biased toward the film so that they absorb a portion of the weight of the upper loops while still permitting the film to be drawn to the outlet 56 of the slack box. The film is threaded through the slack box outlet in the bottom of the slack box and up to an inlet to the film processor 12. In the processor, the film is threaded around a plurality of upper and lower film support spools 58 and 60 to form a plurality of loops in a manner well known in the art. The film is intermittently fed into the input slack box from the input chamber, forming the plurality of loops therein, so that the film processor may be supplied with film continuously even though each cartridge supplies only a short length of film. Thus, the feed to the processor itself is continuous and not completely dependent upon the rate at which the film cartridges are emptied.

The input slack box 30 is provided with an upper film level sensor (not shown) which interlocks with the feed drive roller 50 whereby the roller will not be activated if there is not sufficient room in the slack box to accept an entire strip of film. Similarly, a low film level detector (not shown) is provided which activates an alarm signal to alert the operator to splice a leader strip to the end of the film in the film input chamber to prevent the necessity of stopping the processor transport while customer's film is still therein with the possible accompanying damage thereto.

Similarly, the exit slack box 32 is provided with a low film level sensor (not shown) which interlocks with the film winder whereby the winder 24 will not be activated if there is not enough film in the slack box to permit winding a complete roll. Furthermore, the inlet of the exit slack box is provided with a film static eliminator which removes or minimizes the static charges on the film which would cause adjacent loops of film in the exit slack box to repel each other, reducing the effective capacity of the slack box.

Referring now to FIG. 3, conveyor 22 comprises an identification input at 62 located at the film input station 10 adjacent the film input chamber 20, and an output at 64 adjacent the film output station 14. The conveyor generally comprises an endless track 66 adapted to guide and transport a plurality of film identification container carriers 68. The identification carriers in the preferred embodiment each accommodate a single customer film identification envelope 70 of the type well known in the art in which the film is sent to the processor with the customer's name and address, or other identification, written on the outside. In their simplest form, the container carriers 68 comprise a roller member 72, or other track-following member, that can be supported and guided by the track 66. Dependent from the roller member 72 is a spring clip portion 74 arranged to releasably grasp one end of an envelope 70.

As illustrated in FIG. 3, the track 66 comprises a lower portion 76 which slopes downwardly from the input end 62 to the output end 64. Beyond output end 64, the track is provided with a vertical portion 78 which leads to an upper, sloping portion 79 which slopes downwardly to the input end 62. The upper sloping portion 79 is connected via a vertically curved portion 80 to the inlet end of lower portion 76 of the track. In the embodiment illustrated, the track is disposed in a housing 81 arranged to substantially enclose the track. The housing is provided with carrier openings at the inlet 62 and the outlet 64 whereby the spring clip portion 74 of the carrier is accessible to the respective operators to permit insertion or withdrawal of an envelope 70.

The lower portion 76 of the track is provided with a single gate 82 adjacent the inlet 62, a double gate 84 just before the outlet 64, and a second single gate 86 just after the outlet 64. The upper portion 79 of the track is provided with a double gate 88 just before the inlet 62. The single gates 82 and 86 are normally closed and hold a single carrier in the carrier openings at inlet 62 and outlet 64. The double gates 86 and 88 are arranged to permit selective passage of a single carrier while holding back the following carriers, in a manner well known in the art. The vertical portion 78 of the track is provided with an elevator means such as belt 90 which is arranged to lift carriers 68 from the end of the lower portion 76 of the track beyond outlet 64 to the upper end of the upper portion 79 of the track.

In operation, the input operator picks an envelope 70 containing a film cartridge 36 from the film box 18. The film cartridge is removed from the envelope and is inserted in the fixture 34 in the input chamber 20. The empty envelope 70 is inserted in the spring clip portion 74 of the empty container carrier 68 accessible at the identification input 62. This carrier has previously been released from the upper portion 79 of track 66 by the double gate 88 and, following the curved portion 80, was stopped and held by gate 82 in the carrier input opening. The fixture clamp 38 in the input chamber 20 is closed over the cartridge and the end of the film is withdrawn from the cartridge aperture 40 and is pulled to the splicing station 42 where it is spliced to the trailing end of the preceding strip of film. The splice is visually inspected and the light-tight door 48 is closed. If the identification envelope is present in the carrier 68 at the carrier inlet, the door 48 is latched closed and the feed drive roller 50 at the inlet of the input slack box is activated, feeding the film into the input slack box 30. At the same time, gate 82 is opened permitting the carrier 68 containing the identification envelope to slide down the lower portion 76 of the track until it abuts the preceding carriers held behind double gate 84. Gate 82 is controlled so that it will not release the carrier unless: (1) an identification envelope 70 is attached thereto; (2) a film cartridge 36 is latched in fixture 34; and (3) the light-tight door 48 of the film input chamber is closed. Likewise, the inlet chamber door 48 will not latch nor will the feed drive roller 50 be activated unless the three foregoing conditions are met.

The feed drive roller 50 withdraws film from the cartridge 36 through the closed, dark input chamber 20 until the film end detector 46 detects the end of the film and stops the drive roller with the end of the film at the splicing station 42. The latch on door 48 is then released and the door automatically opens. At the same time the fixture latch 38 is released and the empty cartridge may be automatically ejected or be removed by hand. As the door 48 is opened, double gate 88 is opened, releasing an empty identification carrier which advances to the input opening at 62, ready to accept the next identification envelope.

The film is thereafter pulled from the lower end of the slack box and is fed into the processor 12, wherein it is processed in a manner well known in the art. At the same time, the film identification carrier will be progressing towards the outlet at 64. The number of carriers 68 in the lower portion 76 corresponds to the number of strips of film in the slack boxes and the processor. Inasmuch as the apparatus is controlled so that no film can be removed from the exit slack box without the removal of the corresponding identification envelope and vice versa, and since no film or identification carriers and/or envelopes can be introduced into the system without the other, the processed film will reach the film output station at the same time the corresponding identification envelope does.

The output operator at the output station 14 picks an empty film reel from the supply 26 and places it onto the spindle of the film winder 24. The end of the processed film at the outlet of the exit slack box is threaded onto the empty film reel and the winder is actuated. Only if the preceding envelope carrier has been emptied and passed by gate 86, will the film winder wind the strip of film until the end of the strip is detected by a splice detector 92 at the outlet of the exit slack box 32, stopping the film winder 24. After the film winder is stopped by the splice detector 92, the splice is cut and double gate 84 is actuated, advancing the carrier and identification envelope corresponding to the film just wound. The operator removes the envelope 70 from the carrier 68, and the full reel from the winder 24, and inserts the reel in the corresponding envelope which is then placed in the processed film box 28. As the envelope is removed from the carrier 68, gate 86 is opened releasing the now-empty carrier to be picked up by belt 90 and carried to the upper end of the upper portion 79 of track 66 for return to the inlet end 62 of the identification conveyor.

While the preferred embodiment of the film identification conveyor has been illustrated and described above, the identification conveyor may take many forms so long as it provides the ability to convey the film identification from the input station of the processor to the output station of the processor in an inalterable order and in an intermittent manner. Moreover, the conveyor must be provided with the necessary interlocks to assure that all of the necessary conditions are met before the film identifier is either accepted into the conveyor or is discharged at the film output station.

An alternate embodiment of a film identification conveyor includes a pair of intermittently driven belt members which are arranged to mate along a path extending from the input station to the output station and to grasp a film identifier therebetween. The belt drive is connected to an interlock system similar to that of the preferred conveyor so that the belts are not driven unless the conditions set forth above are met.

Similarly, the identification conveyor function can be accomplished by electronic memory means whereby the film identification would be introduced into the memory at the input station with the same interlock system as above. The identification is sequentially relayed toward the output station so thta it is presented, either visually or in printed form, at the same time as the corresponding film is fed from the exit slack box.

In summary, the present invention relates to a method of continuously processing successive lengths of film strips comprising the steps of removing the film strip container from the film identification container while only a single film identification container carrier is present at the input end of the processing apparatus. The film strip container is inserted in the container holder in the open input chamber and the identification container is inserted in the single container carrier presented at that time. In the input chamber, the leading end of the film strip is removed from the film container and is spliced to the trailing end of the preceding strip of material. The splice is inspected and the cover on the input chamber is closed, excluding all light therefrom. The film input feed is activated, feeding the film strip through a light lock into the input slack box. Simultaneously with feeding the film to the input slack box, the presence of the film identification container in the container carrier is confirmed and the carrier and the container are advanced onto the identification conveyor. The trailing end of the film strip in the input chamber is sensed and the trailing end is stopped at the splicing station with only a short length of the film strip remaining in the input chamber and the input chamber cover is reopened. The film is removed from said slack box and is passed sequentially through the film processing stations and then through the static eliminator into the output slack box. Simultaneously, the identification container carrier and the container are moved on the identification conveyor from the input end of the processing apparatus to the output end of the processing apparatus with the carrier movement being synchronized with the movement of the film through the processing stations. Thus, the film and the corresponding container simultaneously arrive at the output end of the processing apparatus. The leading end of the film strip is detected at the output of the output slack box and is then threaded onto an empty film reel. Only the corresponding container carrier and the film identification container are present at the output end of the processing apparatus at that time. The film strip is wound onto the reel and the trailing end of said film strip is detected and the winding is stopped. The film strip is then cut from the next succeeding film strip and the film identification container is removed from the carrier. The wound reel is removed from the winder and is placed in the film identification container for return to the customer.

Thus the present invention provides a film processing method which permits increased ease and economy of film handling, eliminating the need for placing supplementary identification on the film and yet maintains the correlation between the identification and the film. Moreover, ultimate film quality is improved by substantially reducing the number of times that the film is wound and unwound at the processing plant.

The invention has been described in detail with particular reference to preferred embodiments thereof, but it will be understood that variations and modifications can be effected within the spirit and scope of the invention as described hereinabove and as defined in the appended claims.

We claim:

1. The method of continuously processing successive lengths of identified film strips comprising the steps of separating a film strip container from the film identification, presenting only a single film identification carrier at the input end of the processing apparatus, inserting said film strip container in a container holder in an open input chamber, inserting said identification in said presented carrier, removing a leading end of the film strip from said film container in said holder, splicing the leading end of the film strip to the trailing end of a preceding strip of material, inspecting the splice, and then closing a cover on the input chamber and excluding all light from said chamber, confirming the presence of a film identification in said carrier and then advancing said carrier and identification onto an identification conveyor and activating a film input feed and feeding said film strip through a light lock to an input slack box, sensing the trailing end of said film strip and stopping the trailing end at the splicing station with only a short length of said film strip in said input chamber, reopening the cover on said input chamber, removing said film from said slack box and passing said film sequentially through a plurality of film processing stations and then through a static eliminator into an output slack box, simultaneously moving said identification carrier and said identification on said identification conveyor from the input end of the processing apparatus to the output end of the processing apparatus, said carrier movement being synchronized with the movement of the film through the processing stations whereby the film and the container simultaneously arrive at the output end of the processing apparatus, detecting the leading end of the film strip at the output of the output slack box, threading the film strip onto an empty film reel, presenting only the corresponding carrier and the film identification at the output end of the processing apparatus, winding the film strip onto said reel, detecting the trailing end of said film strip and stopping said winding, cutting said film strip from the next succeeding film strip, removing the film identification from said carrier, and removing said wound reel from the winder and associating it with said film identification.

2. A method for continuously processing a plurality of individual lengths of film each of which is identifiable by a corresponding separable identification means, the method comprising the steps of splicing individual lengths of film into a substantially continuous strip, passing said strip through a film processor along a path from an input end of the processor to an output end of the processor, and simultaneously transferring the corresponding identification means for the individual lengths of film from an input station located adjacent the input end of the film processor to an output station located adjacent the output end of the film processor and along a path separate from the path of the film strip through said processor.

3. A method as set forth in claim 2 further comprising the step of coordinating the passing of each length of film through the film processor with the transfer of its corresponding identification means so that each length of film arrives at the output end of the processor when the corresponding identification means arrives at the output station.

4. A method for sequentially processing a plurality of lengths of film received with separable film identification means, each length of film having a leading end and a trailing end, the method comprising the steps of:

separating the lengths of film from the corresponding identification means;

feeding the individual lengths of film sequentially through a film processor by securing the leading end of one length of film to the trailing end of another length of film and threading the film lengths through the processor from a processor input end to a processor output end;

transferring the corresponding identification means for the lengths of film from an input station located adjacent the input end of the film processor to an output station located adjacent the output end of the film processor and along a path separate from the path of film fed through the processor; and coordinating advancement of each length of film from the input end of the processor with the advancement of the corresponding identification means from the input station; and coordinating delivery of the lengths of film from the output end of the processor with delivery of the corresponding identification means at the output station.

5. A method as set forth in claim 4 wherein transferring of the identification means from the input station to the output station occurs without altering the order in which the corresponding lengths of film are advanced from the input end of the processor toward the output end thereof.

6. A method as set forth in claim 4 wherein the individual lengths of film are each received in a film cartridge capable of excluding light from film within the cartridge and wherein a portion of the film in the cartridge is accessible, the steps of feeding film to the processor further comprising the steps of placing the cartridge in a chamber and effecting splicing of the exposed portion of the film in the cartridge to the trailing end of the preceding length of film under daylight conditions, closing the chamber to exclude daylight from the chamber, and then withdrawing the length of film from the cartridge as it is fed to the processor.

7. A method as set forth in claim 4 further comprising synchronizing the initiation of the feeding of the lengths of film and transferring the identification means so that advancement of a length of film and an identification means occurs substantially simultaneously.

8. A method as set forth in claim 4 wherein the step of transferring the identification means comprises conveying the identification means sequentially in the same order as the corresponding length of film and in an inalterable manner.

9. A method as set forth in claim 4 further comprising separating the lengths of film from each other at the output end of the processor, and then matching each length of film with the corresponding identification means.

References Cited
UNITED STATES PATENTS

| | | | |
|---|---|---|---|
| 1,610,134 | 12/1926 | Jones | 156—157 |
| 3,567,534 | 3/1971 | Eishiro Kushiro | 156—64 |

WILLIAM A. POWELL, Primary Examiner

U.S. Cl. X.R.

156—159, 378; 161—36